(12) United States Patent
Takashima (10) Patent No.: US 7,191,391 B2
(45) Date of Patent: Mar. 13, 2007

(54) FORM PROCESSING DEVICE, AND FORM PROCESSING METHOD AND PROGRAM

(75) Inventor: Keiichi Takashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 10/614,174

(22) Filed: Jul. 8, 2003

(65) Prior Publication Data

US 2004/0010634 A1    Jan. 15, 2004

(30) Foreign Application Priority Data

Jul. 9, 2002    (JP)    ............................. 2002-200523

(51) Int. Cl.
*G06F 17/00* (2006.01)

(52) U.S. Cl. ........................ 715/507; 715/508; 715/513

(58) Field of Classification Search ................ 715/513, 715/507, 505, 760, 508; 709/203; 707/10
See application file for complete search history.

(56) References Cited

U.S. PATENT DOCUMENTS

| | | | | |
|---|---|---|---|---|
| 4,503,499 A | * | 3/1985 | Mason et al. ................ | 718/101 |
| 5,404,294 A | * | 4/1995 | Karnik ......................... | 715/507 |
| 5,761,683 A | * | 6/1998 | Logan et al. ................. | 715/513 |
| 5,784,562 A | * | 7/1998 | Diener ........................ | 709/217 |
| 5,835,712 A | * | 11/1998 | DuFresne .................... | 709/203 |
| 5,890,175 A | * | 3/1999 | Wong et al. ................. | 715/505 |
| 5,929,849 A | * | 7/1999 | Kikinis ......................... | 725/113 |
| 6,061,694 A | * | 5/2000 | Janay et al. ................. | 715/507 |
| 6,192,382 B1 | * | 2/2001 | Lafer et al. .................. | 715/513 |
| 6,247,029 B1 | * | 6/2001 | Kelley et al. ................ | 715/507 |
| 6,247,047 B1 | * | 6/2001 | Wolff .......................... | 709/219 |
| 6,260,039 B1 | * | 7/2001 | Schneck et al. .............. | 707/10 |
| 6,456,303 B1 | * | 9/2002 | Walden et al. ............... | 715/705 |

(Continued)

FOREIGN PATENT DOCUMENTS

JP    11-3330    1/1999

(Continued)

OTHER PUBLICATIONS

M. Brown, "Using Netscape Communicator 4, Special Addition", QUE, Copyright 1997, pp. 112, 123, 127, 133-135.*

*Primary Examiner*—Doug Hutton
*Assistant Examiner*—J H Blackwell
(74) *Attorney, Agent, or Firm*—Fitzpatrick, Cella, Harper & Scint (57) ABSTRACT

There is provided a format processing method for overlaying data of a file located on an Internet server onto a predetermined field in a form. In particular, there is provided a form processing method for reading a field data file storing data to be overlaid onto a defined field in a form, and overlaying data of the field data file onto a field in the form, the form processing method including: a determination step of determining, if data of the field data file is description specifying an external file, whether the description of the data is in a URL format (step S301); an overlaying step of downloading the external file in a network server in compliance with Internet protocols (step S305) and overlaying the data of the downloaded external file onto the field in the form if the description is determined to be in a URL format at the determination step (step S301).

7 Claims, 11 Drawing Sheets

U.S. PATENT DOCUMENTS

| | | | |
|---|---|---|---|
| 6,460,042 B1* | 10/2002 | Hitchcock et al. | 707/10 |
| 6,473,892 B1* | 10/2002 | Porter | 717/106 |
| 6,484,263 B1* | 11/2002 | Liu | 726/8 |
| 6,490,601 B1* | 12/2002 | Markus et al. | 715/507 |
| 6,507,865 B1* | 1/2003 | Hanson et al. | 705/36 R |
| 6,589,290 B1* | 7/2003 | Maxwell et al. | 715/507 |
| 6,651,217 B1* | 11/2003 | Kennedy et al. | 715/507 |
| 6,658,662 B1* | 12/2003 | Nielsen | 725/109 |
| 6,662,340 B2* | 12/2003 | Rawat et al. | 715/507 |
| 6,732,331 B1* | 5/2004 | Alexander | 715/513 |
| 6,760,748 B1* | 7/2004 | Hakim | 709/204 |
| 6,775,670 B2* | 8/2004 | Bessette | 707/10 |
| 6,879,965 B2* | 4/2005 | Fung et al. | 705/39 |
| 6,886,136 B1* | 4/2005 | Zlotnick et al. | 715/780 |
| 7,035,907 B1* | 4/2006 | Decasper et al. | 709/212 |
| 2001/0050681 A1* | 12/2001 | Keys et al. | 345/418 |
| 2002/0023108 A1* | 2/2002 | Daswani et al. | 707/507 |
| 2002/0059425 A1* | 5/2002 | Belfiore et al. | 709/226 |
| 2002/0103826 A1* | 8/2002 | Kriho et al. | 707/505 |
| 2002/0111961 A1* | 8/2002 | Billings et al. | 707/505 |
| 2003/0023641 A1* | 1/2003 | Gorman et al. | 707/530 |
| 2003/0169292 A1* | 9/2003 | Carew et al. | 345/760 |
| 2004/0030991 A1* | 2/2004 | Hepworth et al. | 715/507 |
| 2004/0078756 A1* | 4/2004 | Napper et al. | 715/507 |
| 2004/0205357 A1* | 10/2004 | Kuo et al. | 713/200 |
| 2004/0205533 A1* | 10/2004 | Lopata et al. | 715/507 |
| 2005/0183003 A1* | 8/2005 | Peri | 715/507 |
| 2005/0216356 A1* | 9/2005 | Pearce et al. | 705/26 |

FOREIGN PATENT DOCUMENTS

| | | |
|---|---|---|
| JP | 2000-112810 | 4/2000 |
| JP | 2002-163597 | 6/2002 |

* cited by examiner

| CACHE NAME | ORIGINAL FILE ADDRESS | TIME STAMP |
|---|---|---|
| 00000001.jpg | http://www.server1.com/image1.jpg | 2001/05/14 |
| 00000002.gif | http://www.server2.com/picture.gif | 2001/06/13 |
| 00000003.bmp | ftp://ftp.server5.co.jp/table.bmp | 2001/06/29 |
| . . . . . . . . . . | . . . . . . . . . . | . . . . . . . . . . |
| | | |
| | | |

FIG. 11

FORM PROCESSING DEVICE, AND FORM PROCESSING METHOD AND PROGRAM

FIELD OF THE INVENTION

The present invention relates to processing technology for overlaying each data item described in a field data file onto a predetermined field in a form (memory area in a program for receiving data of the field data file).

BACKGROUND OF THE INVENTION

Traditionally, a form processing program has existed, which overlays each data item described in a field data file onto a predetermined field in a form to create a form. In order to expand such a form processing program to allow handling of file-type data such as a bitmap file, the applicants consider to specify an external file (a file which can be specified with a pathname indicating a target location described in the field data file, among files stored in a local drive or a network drive) by describing, in a field data file, the pathname indicating a target location to which the bitmap file is stored. For example, description such as IMAGE1=c:¥data¥image.bmp is provided in the field data file.

In the above described method, however, it is necessary that a field data file and external files, which are file-type data, described therein are on a local drive of a computer on which a form processing program is operating or a network drive accessible to the computer (hereinafter collectively referred to as a local drive), and accordingly, it is impossible to handle files located on an Internet/intranet server such as a Web server increasing in number nowadays.

SUMMARY OF THE INVENTION

The present invention is intended to solve the above problem. The object of the invention is to provide a form processing method, a form processing device and a program for executing form processing that are capable of overlaying data in an external file located on an Internet/intranet server onto a predetermined field in a form.

In order to achieve the above object, the form processing method according to the present invention is constituted as follows: it is a form processing method for reading in a field data file storing data to be overlaid onto a defined field in a form, and overlaying data of the field data file onto a field in the form, the form processing method comprising:

a determination step of determining, when the data of the field data file is description specifying an external file, whether the description of the data is in a URL format;

an overlaying step of downloading the external file from a network server in compliance with Internet protocols and overlaying data of the downloaded external file onto the field in the form when the description is determined to be in a URL format at the determination step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

Preferred embodiments of the present invention will now be described in detail in accordance with the accompanying drawings.

[First Embodiment]

Embodiments of the present invention are now described below with reference to drawings. The terms used in the description below are defined as follows. A "form" means a file having a frame, fixed graphics, characters, etc. and allowing data to be overlaid onto predetermined fields included therein. A "field data file" means a file in which data to be overlaid onto the predetermined fields in the form is divided into data items and stored. A "field" is a basic unit of a form used when data is overlaid onto the form. A "data item" means each of elements composing data in the field data file. A "file-type data" means data stored as a file (such as image data stored as a bitmap file). A "form processing program" refers to a program for overlaying data from the field data file onto the defined fields in the form.

Figure 1:
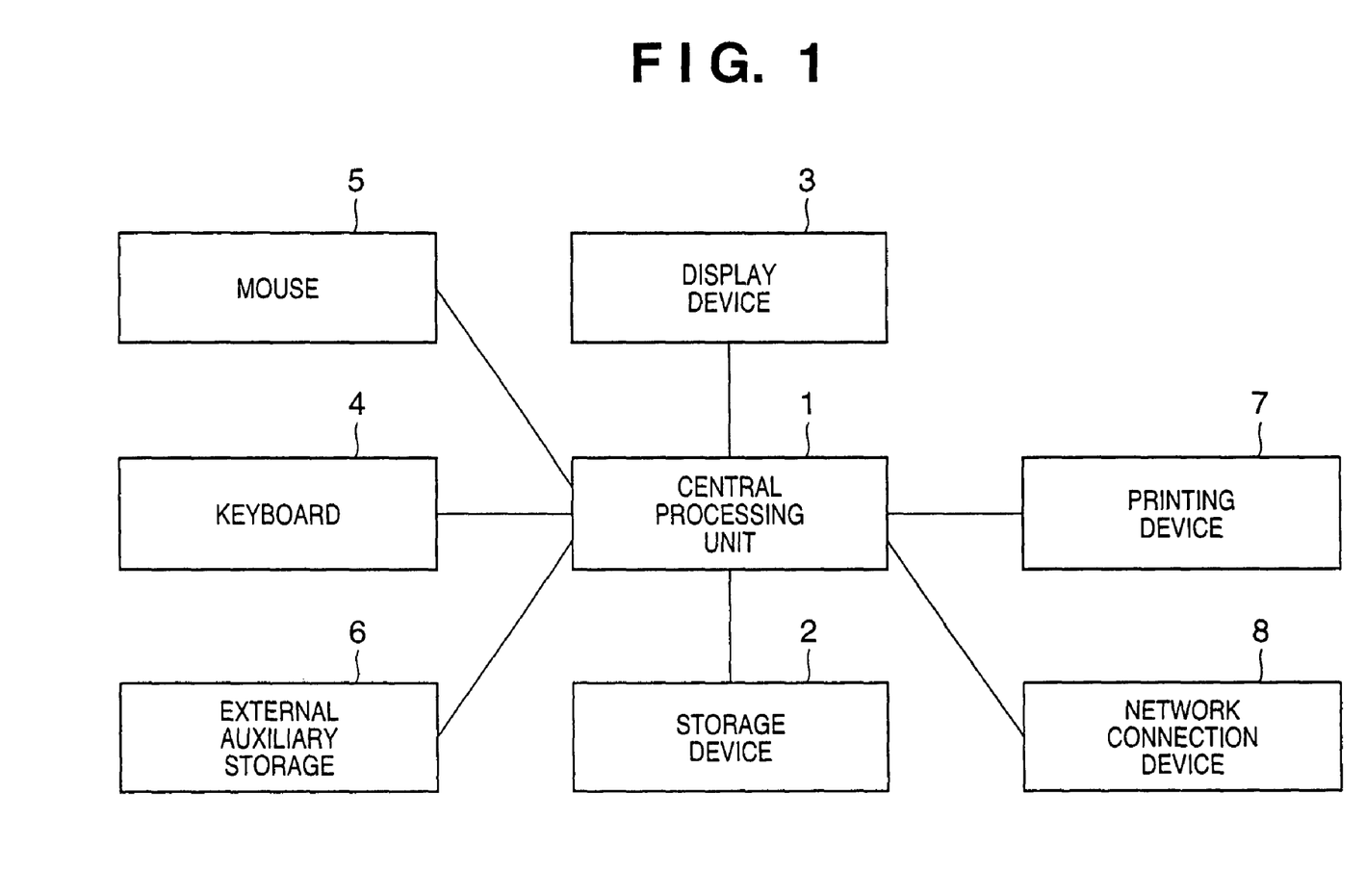
FIG. 1 is a block diagram showing a hardware configuration of a form processing device according to an embodiment of the present invention.
Figure 11:
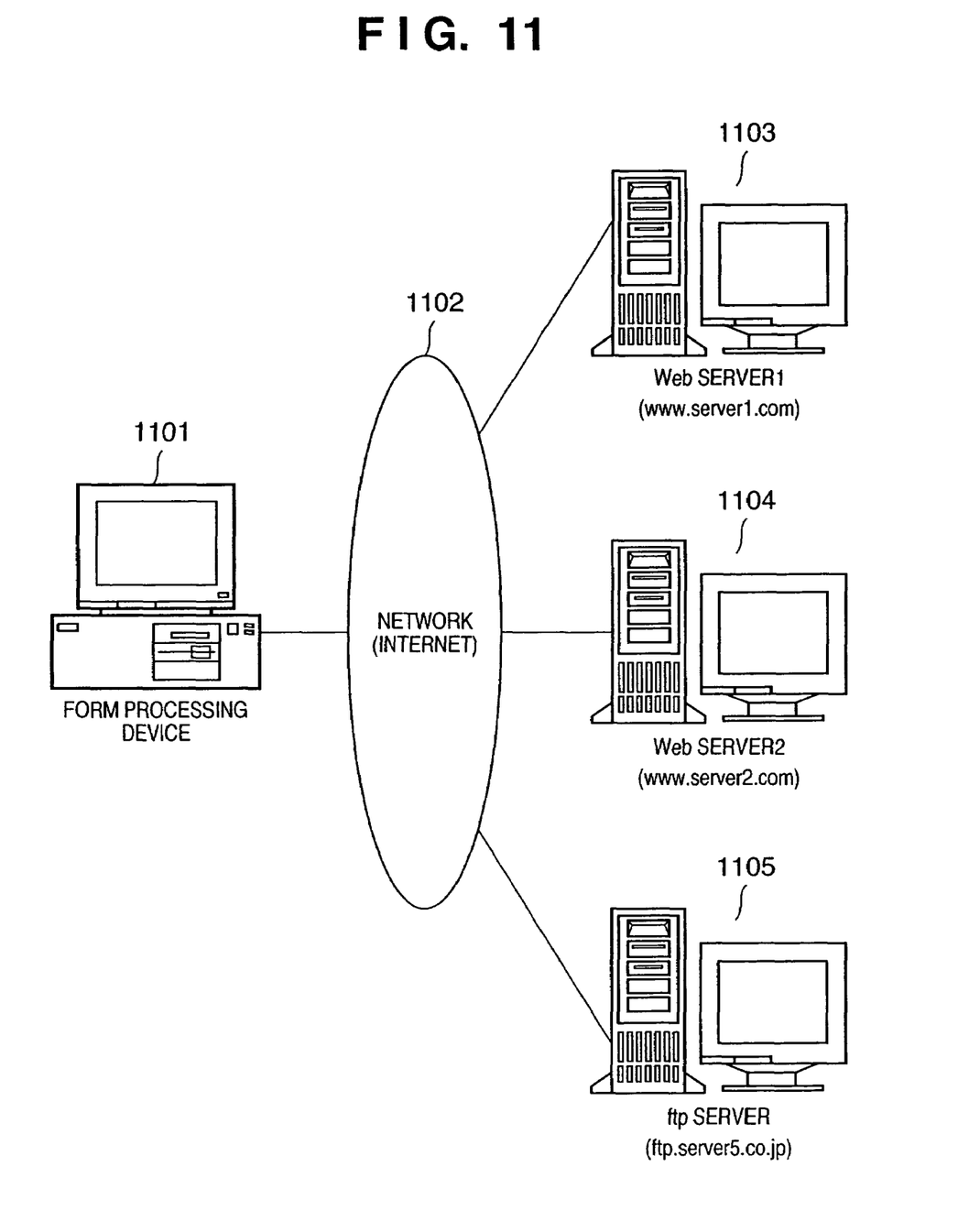
FIG. 11 shows an example of a network system provided with a form processing device according to the present invention.

FIG. 1 is a block diagram showing a system configuration of a form processing device according to a first embodiment of the present invention. FIG. 11 is a block diagram of a network including the form processing device (a network in which the form processing device is connected to a web server etc. via the Internet). FIGS. 2 to 6 show a flowchart showing operation of the form processing method according to the first embodiment.

Figure 7:
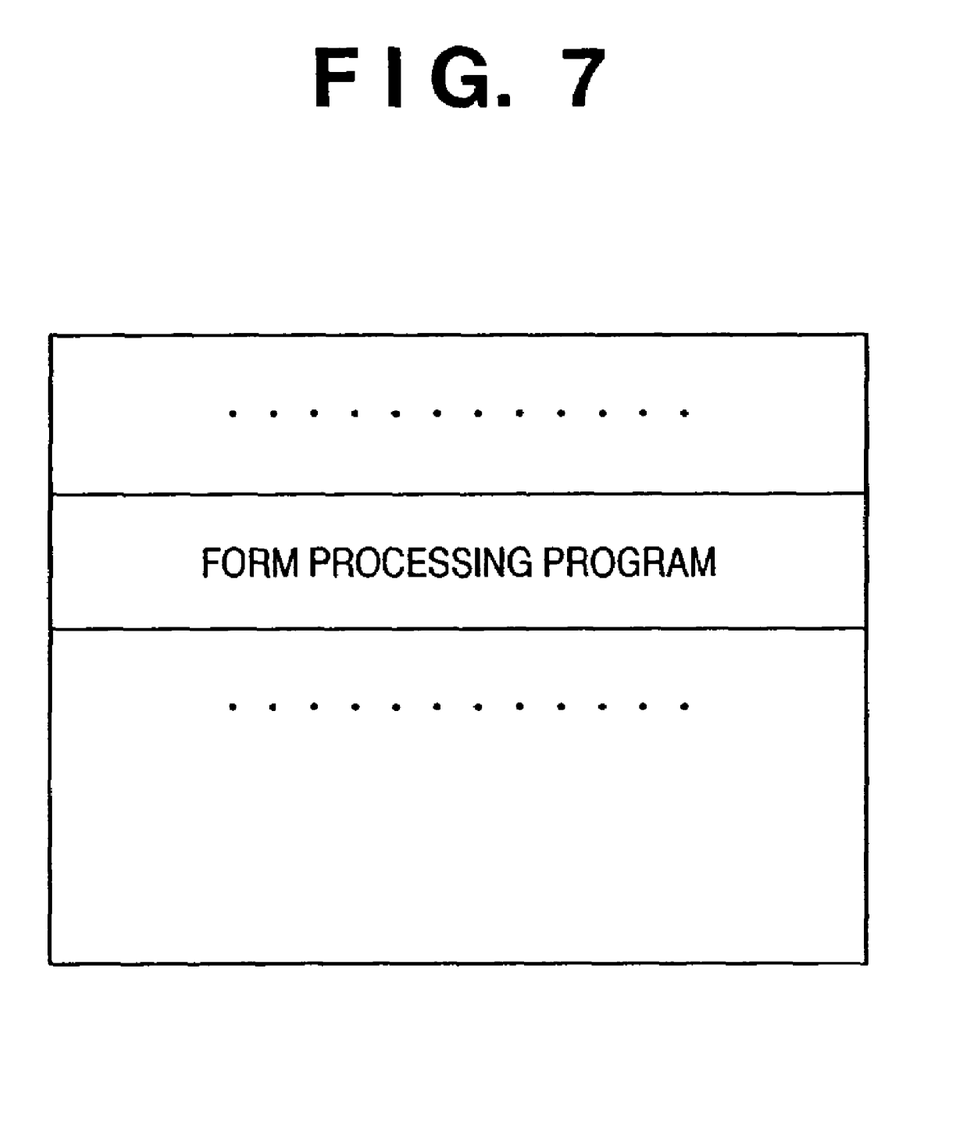
FIG. 7 shows a configuration of a form processing program according to the present invention.

In FIG. 1, reference numeral 1 denotes a central processing unit, 2 denotes a storage device such as RAM, 3 denotes a display device such as CRT, 4 denotes a keyboard, 5 denotes a mouse, 6 denotes an external auxiliary storage, 7 denotes a printing device and 8 denotes a network connection device. The external auxiliary storage 6 suggests that a program and the like are provided from a storage medium to a computer. The following can be used as the storage medium: ROM, floppy© disk, CD-ROM, hard disk, memory card, magneto-optical disk, etc. FIG. 7 shows a configuration of a form processing program stored in the storage medium.

As shown in FIG. 11, a form processing device 1101 is connected to Web servers (Web server 1 (1103) and Web server 2 (1104)) and a FTP server 1105 via a network (such as the Internet) and can access files stored in Internet servers.

Figure 8:
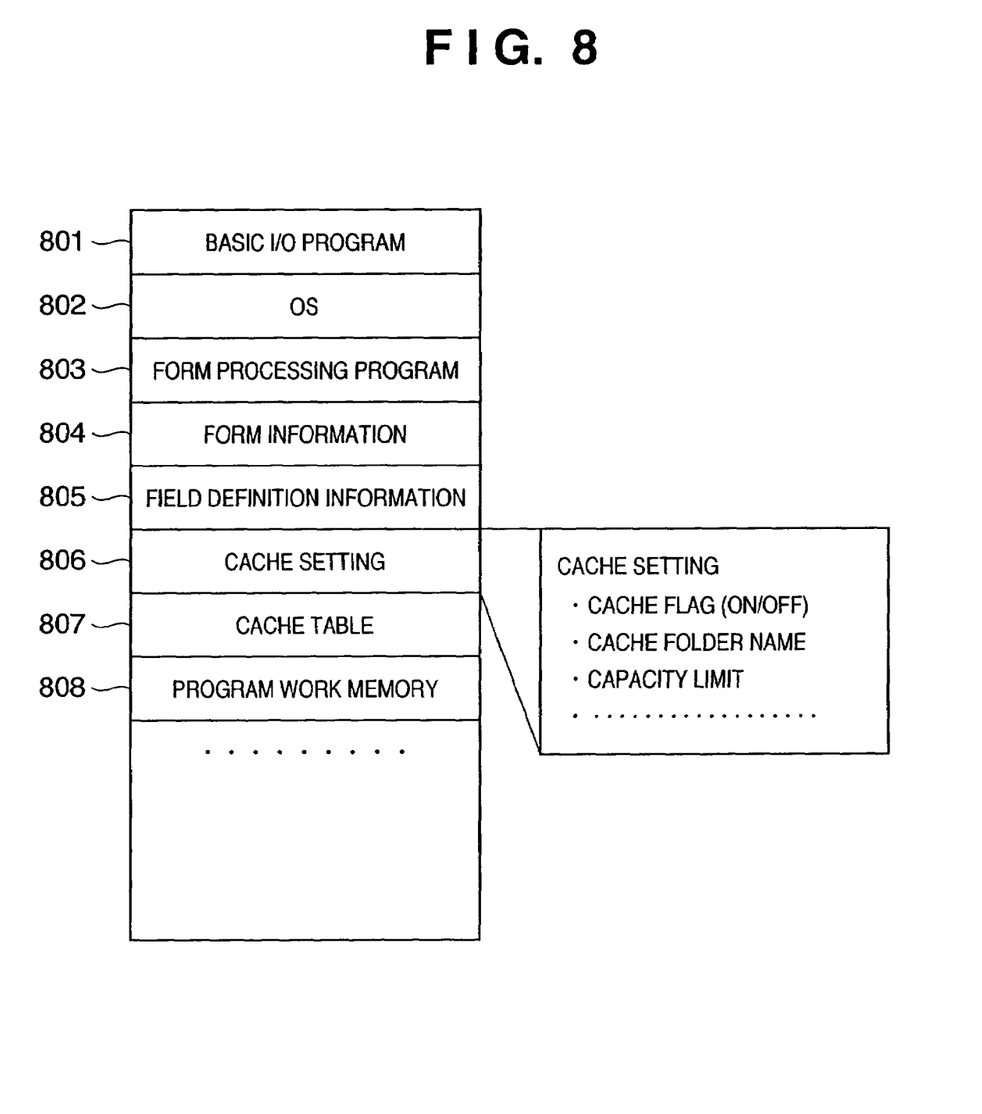
FIG. 8 shows a memory map in a condition that a form processing program according to the present invention is executable.

FIG. 8 shows a memory map in a condition that a form processing program 803, form information 804 and field definition information 805, cache setting 806, and cache table 807 are stored in the storage device 2 and the program is executable. The form information is layout information for fixed graphics and characters of a form such as a frame.

The field definition information is information such as location, size and character attributes of each field onto which data of a field data file is overlaid and the type of the data to be overlaid. The cache setting sets a cache flag indicating whether to cache a file downloaded from an Internet/intranet server (collectively referred to as a network server) in conformity to the Internet protocols into a disk in a local drive of a client, a cache folder name, capacity limit, etc. The cache table is a list of combinations of a cache file name, the original URL address and a time stamp.

Figure 10:
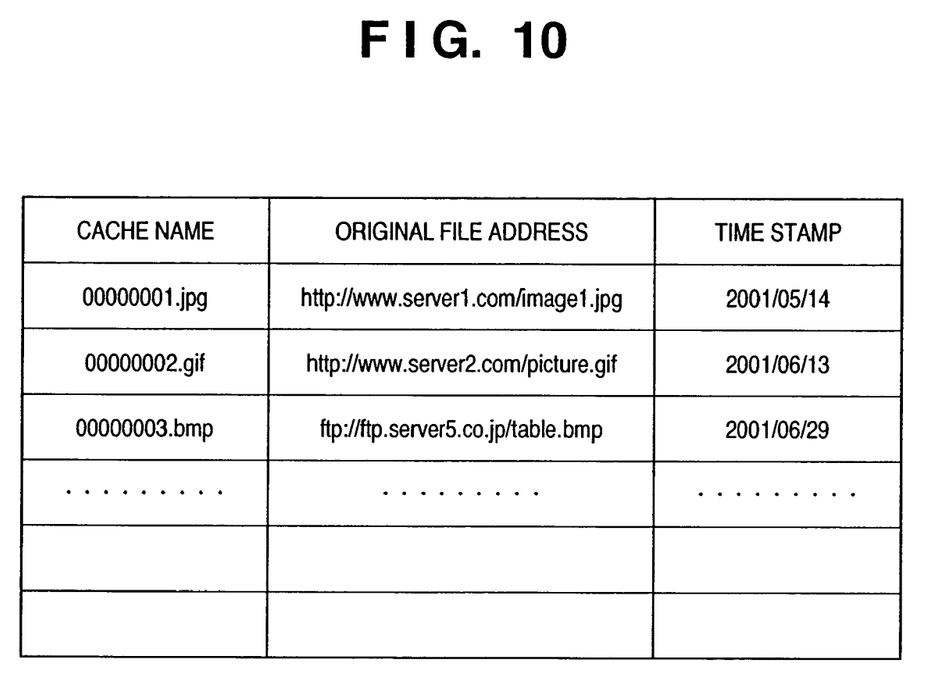
FIG. 10 shows an example of a cache table generated by a form processing program according to the present invention.

FIG. 10 shows an example of a cache table. Cache files are stored in a folder with a cache folder name set in the cache setting, and any cache file name may be used only if it is unique in the cache folder. A character string composed of randomly generated eight-digit hexadecimal figures followed by the extension of an original file is used herein as a cache file name.

The time stamp is the date of the original file shown when the cache file is created. If there is any file newer than this at the original URL address, a new cache file must be created.

Figure 2:
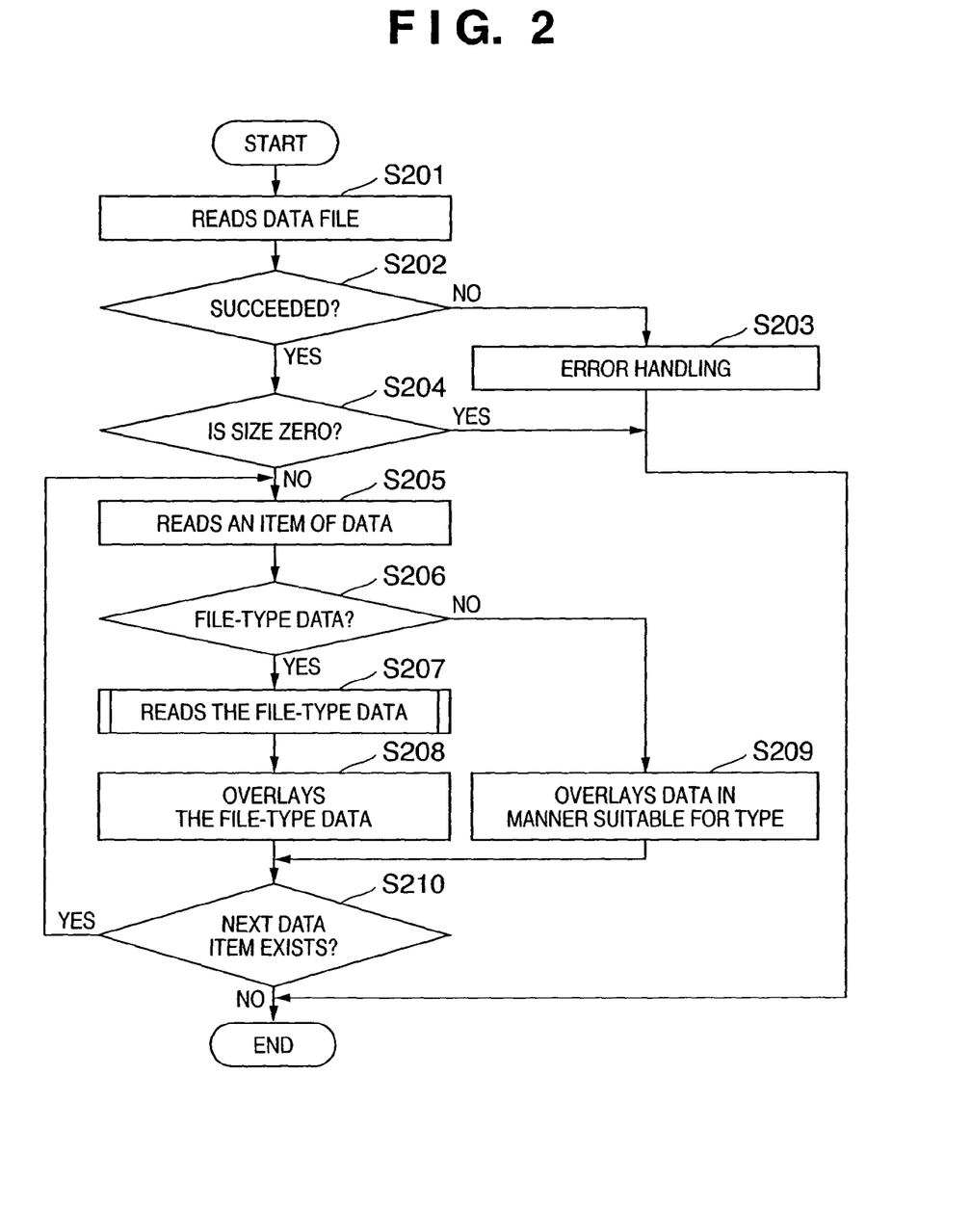
FIG. 2 is a flowchart showing a flow of data processing by a form processing method according to an embodiment of the present invention.

The embodiment is an example where a form processing program operating on a client downloads a field data file located on a Web server and an external file, which is file-type data, described in the field data file into a local drive and overlays them onto a form, and the process is performed in a procedure as shown in FIG. 2.

First, a field data file stored in a Web server or a FTP server is downloaded onto a work memory 808 of a storage device 2 (step S201). The field data file is generated on a Web server or a FTP server by derivation of a variety of data from a database triggered by a user operation in a form processing program operating on a client or a system event. Files are generally downloaded from a Web server or a FTP server via asynchronous data transfer.

Figure 9A:
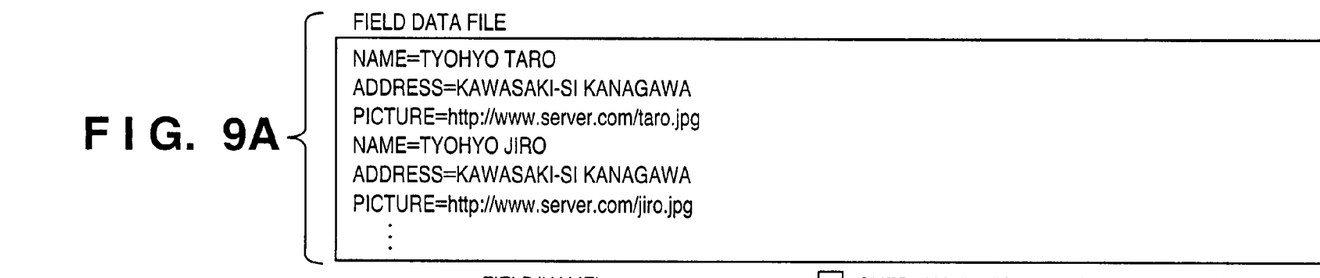
FIGS. 9A and 9B show an example of a field data file for which a form processing program according to the present invention performs form processing, and an example of a form obtained after the form processing.
Figure 9B:
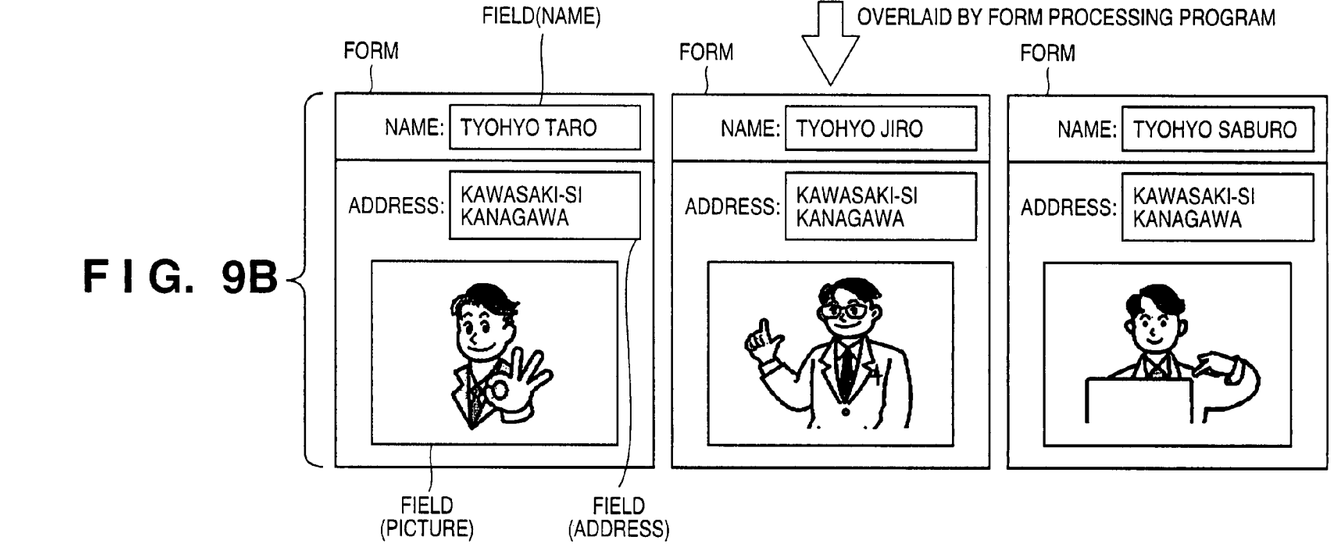

FIGS. 9A and 9B show a description example for a field data file (FIG. 9A), and forms for which overlaying process by a form processing program has been completed (FIG. 9B). The line "PICTURE=http://www.server.com/taro.jpg" overlays a JPEG file specified by the form of "label name=file name" onto a field having a label name "PICTURE" in the form. In form processing programs, data of a field data file created on a Web server is usually not used by a client many times but is regarded to be discarded when the process is completed or not to be left on a local drive as a cache file because of security problems. Accordingly, in this example, the field data file is not stored as a cache file in a local drive.

It is then determined whether the field data file has been downloaded successfully (step S202). If not, error handling is performed (step S203), and the entire process ends. If the field data file has been downloaded successfully, then it is determined whether the size is zero (step S204). If the size is zero, the entire process ends. If the size is larger than zero, then an item of data is read in from the field data file (step S205). Though a line from the "Label name=" to the end of line is an item of data in the field data file shown in FIG. 9A, a portion from the beginning of line or a comma to the end of line or a comma is an item of data in the case of a comma-delimitated CSV file.

Then, it is determined whether the item of data read in is a file-type data (S206). This determination is performed based on field definition information stored in the storage device 2 in advance. In the case of the first line of the field data file shown in FIG. 9A, the label name of the field in the form onto which this data is overlaid is "NAME", so that a field with a label name "NAME" is searched from the field definition information stored in the storage device 2 to determine the data type.

If the data item is file-type data, an external file is read in based on the pathname shown in the field data file (step S207). As described later, the content of the external file is stored on the work memory 808 of the storage device 2 and its memory handle is stored in a variable "file_data" on the work memory 808 of the storage device 2 by this processing.

In case of any error caused during the processing, a NULL handle is stored in the variable "file_data". The data stored in the memory handle pointed to by the variable "file_data" is then overlaid onto a filed in the form (step S208).

If the data item is not a file-type data, the existing data overlaying processing suitable for the data type is performed (step S209). Then, it is determined whether the next data item exists in the field data file (step S210). If it exists, the process returns to step S205 and continues processing for it. All the data items have been overlaid, the process ends.

Figure 3:
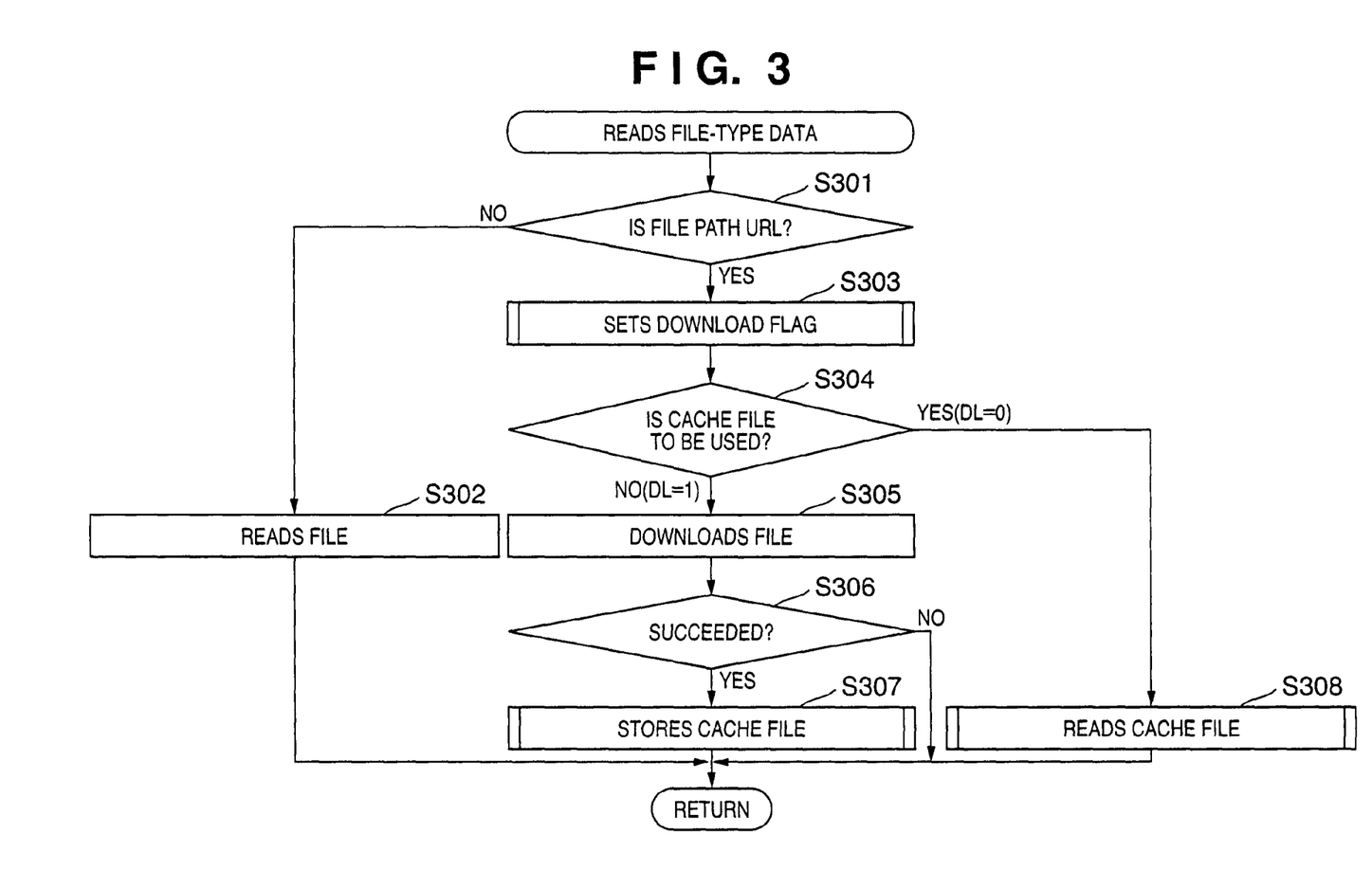
FIG. 3 is a flowchart showing a flow of data processing by a form processing method according to the present invention.

The processing of reading in an external file, which is file-type data (step S207) is performed in a procedure as shown in FIG. 3. It is determined whether the pathname described in the field data file indicates the external file to be on an Internet/intranet server (step S301). If the pathname is a URL beginning with http:// or ftp://, the external file is determined to be on an Internet/intranet server. If the external file is not on an Internet/intranet server, it is read in from a local drive (step S302).

In the file reading-in processing, the content of the external file is stored in the work memory of the storage device 2, and its memory handle is stored in the variable "file_data" on the work memory of storage device 2. In case of any error caused during the processing, a NULL handle is stored in the variable "file_data". If the pathname indicates the external file to be on an Internet/intranet server at step 301, then it is set whether to download the external file from the address (step S303).

As a result of the processing, "1" is stored in the variable "flag_download" of the work memory of the storage device 2 if the external file is determined to be downloaded, and "0" is stored if it is determined not to be downloaded. By determining the value (step S304), the external file is downloaded from the URL address of the pathname if the value is "1" (S305).

In the downloading processing, the content of the external file is stored on the work memory of the storage device 2, and its memory handle is stored in the variable "file_data" on the work memory of the storage device 2. In case of any error caused in the processing, a NULL handle is stored in the variable "file_data". Then it is determined whether the external file has been downloaded successfully (step S306). If it has been downloaded successfully, the downloaded external file is stored in a cache file (step S307). If the download has failed, the process ends. If the "flag_download" is "0" at step S304, a cache file is read in (step S308).

Figure 4:
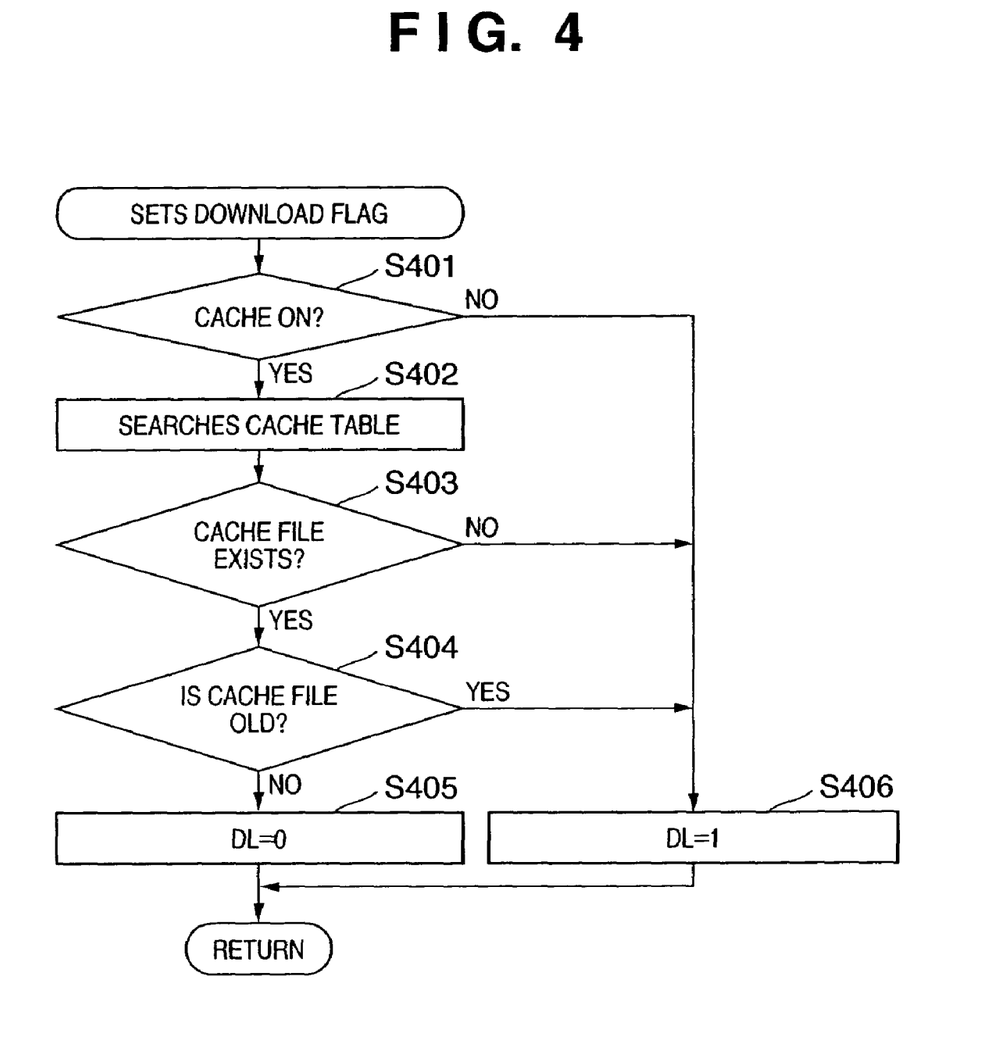
FIG. 4 is a flowchart showing a flow of data processing by a form processing method according to the present invention.

The download flag setting processing (step S303) is performed in a procedure as shown in FIG. 4. First, it is determined whether the flag in the cache setting of the storage device 2 is "ON" (step S401). If it is "ON", the URL address of the file-type data currently processed is searched in the cache table (FIG. 10) of the storage device 2 to check if it is registered therewith (step S402). It is then determined whether it has been found (step S403). If it already exists, the time stamp information of the external file of the URL address is read in and compared with the time stamp of the cache file to determine whether the time stamp of the cache file is older than that of the external file of the URL address (Step S404). If it is not older, "0" is set in a variable "DL" on the work memory of the storage device 2 (step S405). Otherwise, "1" is set in the DL (step S406). The variable "DL" indicates whether to download the file of the URL address.

Figure 5:
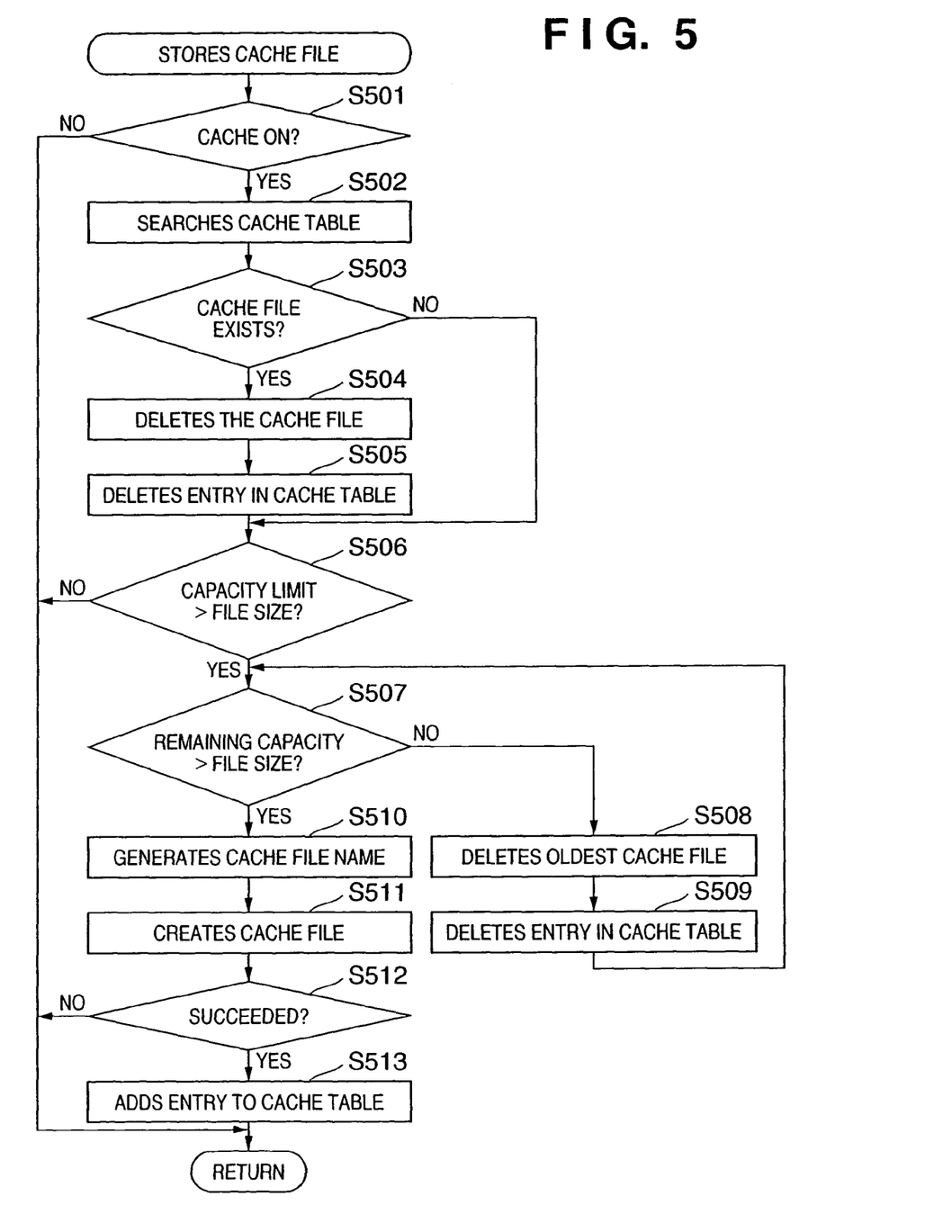
FIG. 5 is a flowchart showing a flow of data processing by a form processing method according to the present invention.

The cache file storing processing (step S307) is performed in a procedure as shown in FIG. 5. First, it is determined whether the flag in the cache setting of the storage device 2 is "ON" (step S501). If it is "ON", the URL address of the file-type data currently processed is searched in the cache table of the storage device 2 to check if it is registered therewith (step S502). It is then determined whether it has been found (step S503).

If it is found in the cache table, it means the external file of the URL address has been cached. If it is found, the external file with the cache file name of the entry is deleted from the cache folder (step S504), and the entry is also deleted from the cache table (step S505).

Then it is determined whether the capacity limit in the cache setting of the storage device 2 is larger than the content of the memory handle stored in the variable "file_data" (file size of the external file) on the work memory of the storage device 2 (step S506). If the capacity limit in the cache setting is smaller than the content of the memory handle, the content cannot be cached and consequently the process ends. If the capacity limit is larger, it is then determined whether the remaining capacity of the cache folder (that is, the capacity limit minus the current folder size) is larger than the content of the memory handle stored in the variable "file_data" (step S507).

If the remaining capacity (free space) of the cache folder is smaller, a cache file of the entry with the oldest time stamp in the cache table of the storage device 2 is deleted (step S508), and the entry is also deleted from the cache table (step S509). The process then returns to step S507, and deletes older cache files until the content of the memory handle stored in the variable "file_data" can be stored in a cache file.

If the remaining capacity of the cache folder is larger than the content of the memory handle stored in the variable "file_data" at step S507, a cache file name which is not used for other existing cache files is generated (step S510), and a cache file with the content of the memory handle stored in the variable "file_data" written thereto is created in the cache folder with the file name (step S511). It is then determined whether the cache file has been created successfully (step S512). If it has been generated successfully, a new entry showing a set of the created cache name, the original URL address and a time stamp is created and added to the cache table (FIG. 10) (step S513).

Figure 6:
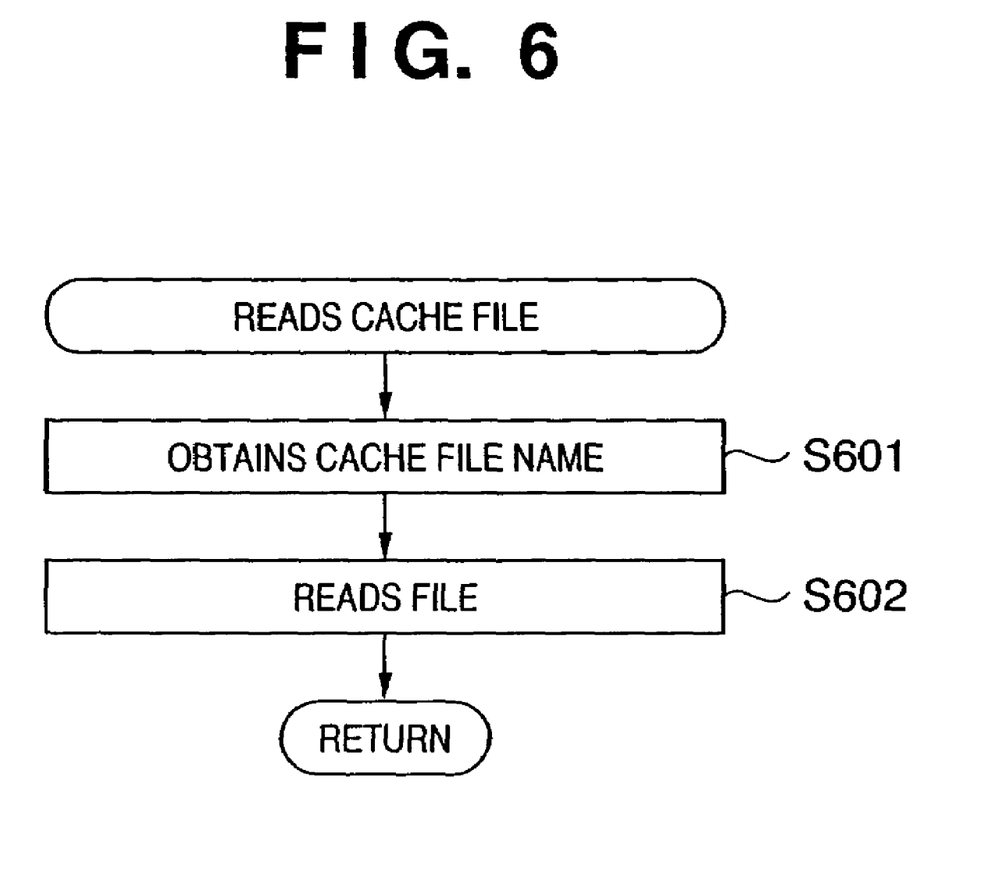
FIG. 6 is a flowchart showing a flow of data processing by a form processing method according to the present invention.

The cache file reading-in processing (step S308) is performed in a procedure as shown in FIG. 6. First, a cache file name associated with the URL address of the file-type data currently processed is obtained from the cache table of the storage device 2 (step S601). Since this processing is performed only when the URL address of the file-type data currently processed is found in the cache table of the storage device 2 in the processing at step S303, the cache name is surely obtained at step S601. Then, the external file with the obtained cache file name is read in (step S602). In the cache file reading-in processing, the content of the external file is stored on the work memory of the storage device 2, and its memory handle is stored in the variable "file_data" on the work memory of the storage device 2. In case of any error caused during the process, a NULL handle is stored in the variable "file_data".

[Second Embodiment]

Though the field data file is on an Internet/intranet server in the embodiment described above, it is also possible to handle a file on an Internet/intranet server, shown as a URL address in a field data file, even if the field data file is on a local disk or a file server.

[Other Embodiments]

The present invention can be applied to a system configured by multiple pieces of equipment (for example, host computer, interface equipment, reader, and printer) or to a device consisting of a single piece of equipment (for example, copying machine, and facsimile machine).

It will be apparent that the object of the present invention can be achieved by providing a system or a device with a storage medium, to which program codes of a software implementing the functions of the embodiments are recorded, so that the computer (or CPU or MPU) of the system or the device reads and executes the program codes stored in the recording medium.

In this case, the program codes themselves, which are read out from the recording medium, implement the functions of the above embodiments, and the recording medium storing the program codes constitutes the present invention.

As the storage medium for providing the program codes, the following can be used: floppy© disk, hard disk, optical disk, magneto-optical disk, CD-ROM, CD-R, magnetic tape, non-volatile memory card, ROM, etc.

It will be apparent that the embodiments of the present invention include not only a case where a computer executes the program codes read out to implement the functions of the embodiments but also a case where the OS (operating system) operating on the computer executes a part or all of the actual processings based on the directions by the program codes to implement the functions of the embodiments.

Furthermore, it will be apparent that the embodiments of the present invention include a case where the program codes read out from the storage medium are written to memory provided in a function extension board inserted into the computer or a function extension unit connected to the computer, and then the CPU provided in the function extension board or function extension unit executes a part or all of the actual processings based on the directions by the program codes to implement the functions of the embodiments.

As described above, according to the present invention, it is possible to overlay data in an external file located on an Internet/intranet server onto a predetermined field in a form.

As many apparently widely different embodiments of the present invention can be made without departing from the spirit and scope thereof, it is to be understood that the invention is not limited to the specific embodiments thereof except as defined in the claims.

What is claimed is:

1. A form processing device for reading a field data file which stores values to be overlaid onto each of a plurality of fields in a form, and for overlaying the values stored in the read field data file onto each of the plurality of fields in the form, the form processing device comprising:

first determination means for determining, based on field definition information which defines each of the plurality of fields in the form, that at least one of the plurality of fields is defined as a field onto which an external file is to be overlaid;

second determination means for determining, that at least one value stored in the field data file is URL data; and overlaying means for downloading the external file from a network server based on the URL data and overlaying the downloaded external file onto the at least one of the plurality of fields.

2. A form processing method for reading a field data file which stores values to be overlaid onto each of a plurality of fields in a form, and overlaying the values stored in the read field data file onto each of the plurality of fields in the form, the form processing method comprising:

a first determination step of determining, based on field definition information which defines each of the plurality of fields in the form, that at least one of the plurality of fields is defined as a field onto which an external file is to be overlaid;

a second determination step of determining, that at least one value stored in the field data file is URL data; and an overlaying step of downloading the external file from a network server based on the URL data and overlaying the downloaded external file onto the at least one of the plurality of fields.

3. A computer-readable storage medium storing a program for causing a computer to execute a form processing method of reading a field data file which stores values to be overlaid onto each of a plurality of fields in a form, and overlaying the values stored in the read field data file onto each of the plurality of fields in the form, wherein the method comprises:

a first determination step of determining, based on field definition information which defines each of the ura of fields in the form, that at least one of the plurality of fields is defined as a field onto which an external file is to be overlaid;

a second determination step of determining, that at least one value stored in the field data file is URL data; and an overlaying step of downloading the external file from a network server based on the URL data and overlaying the downloaded external file onto the at least one of the plurality of fields.

4. The computer-readable storage medium according to claim 3, wherein the method further comprises:

a storing step of storing the downloaded external file, into a local drive.

5. The computer-readable storage medium according to claim 4, further comprising:

a third determination step of determining whether the time stamp of the downloaded external file stored on the local drive is older that the time stamp of the external file stored on the network server, wherein:

if the third determination is positive, then the external file stored on the network server is downloaded and the downloaded external file stored on the local drive is updated, and if the third determination is negative, then the downloaded external file stored on the local drive is retained.

6. The computer-readable storage medium according to claim 3, further comprising:

a third determination step of determining whether the downloaded external file is smaller than a predetermined file capacity, wherein:

if the determination is positive, then the downloaded external file is stored on a local drive, and if the third determination is negative, then the downloaded external file is not stored on the local drive.

7. The computer-readable storage medium according to claim 4, wherein said storing step includes deleting an external file stored in the local drive if a file capacity of the downloaded external file is larger than a free space of the local drive.

* * * * *

UNITED STATES PATENT AND TRADEMARK OFFICE
CERTIFICATE OF CORRECTION

PATENT NO.       : 7,191,391 B2
APPLICATION NO.  : 10/614174
DATED            : March 13, 2007
INVENTOR(S)      : Keiichi Takashima It is certified that error appears in the above-identified patent and that said Letters Patent is hereby corrected as shown below:

<u>TITLE PAGE, ITEM [74] ATTORNEY, AGENT, OR FIRM</u>

"Fitzpatrick, Cella, Harper & Scint" should read --Fitzpatrick, Cella, Harper & Scinto--.

<u>COLUMN 4</u>

Line 34, "filed" should read --field--.

<u>COLUMN 8</u>

Line 2, "ura" should read --plurality--.
Line 15, "file," should read --file--.
Line 22, "that" should read --than--.

Signed and Sealed this

Twenty-third Day of October, 2007

JON W. DUDAS
*Director of the United States Patent and Trademark Office*